(12) United States Patent
Nitta et al.

(10) Patent No.: US 11,833,425 B2
(45) Date of Patent: Dec. 5, 2023

(54) INFORMATION PROCESSING SYSTEM, INFORMATION PROCESSING APPARATUS, COMPUTER-READABLE NON-TRANSITORY STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Masahiro Nitta, Kyoto (JP); Junpei Horita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 482 days.

(21) Appl. No.: 17/226,448

(22) Filed: Apr. 9, 2021

(65) Prior Publication Data
US 2021/0316216 A1 Oct. 14, 2021

(30) Foreign Application Priority Data

Apr. 13, 2020 (JP) .................. 2020-071806

(51) Int. Cl.
| | |
|---|---|
| A63F 9/24 | (2006.01) |
| A63F 11/00 | (2006.01) |
| G06F 13/00 | (2006.01) |
| G06F 17/00 | (2019.01) |
| A63F 13/52 | (2014.01) |
| G06F 16/23 | (2019.01) |
| H04L 9/40 | (2022.01) |
| G06F 9/48 | (2006.01) |
| G06Q 20/12 | (2012.01) |

(52) U.S. Cl.
CPC ............ *A63F 13/52* (2014.09); *G06F 9/4843* (2013.01); *G06F 16/2379* (2019.01); *H04L 63/102* (2013.01); *H04L 63/108* (2013.01); *G06Q 20/127* (2013.01)

(58) Field of Classification Search
CPC ... G07F 17/32; G07F 17/3214; G07F 17/3233
USPC ........................ 463/1, 20, 22, 25, 30, 31, 39
See application file for complete search history.

(56) References Cited

PUBLICATIONS

Apple Japan, "Buy additional app features with in-app purchases and subscriptions", [online], [searched on Mar. 30, 2020], Internet (URL:https://support.apple.com/ja-jp/HT202023) with English Translation, 6 pages.

(Continued)

*Primary Examiner* — Adetokunbo O Torimiro
(74) *Attorney, Agent, or Firm* — Nixon & Vanderhye PC

(57) ABSTRACT

If an account is changed in a periodic service withdrawn state, a first timing which is an in-game item distribution timing on an account before the change, a second timing which is the next distribution timing, and a third timing which is the distribution timing next thereto, are acquired. A valid period of a periodic service that has been associated with an account after the change is acquired. If the expiration timing of the valid period is at or before the third timing, a post-change distribution timing which is a distribution timing for the first time after the account change timing is determined as the third timing. If the expiration timing is after the third timing, the post-change distribution timing is determined in accordance with a second valid period. An in-game item is provided at both of timings from the first timing onward and from the post-change distribution timing onward.

12 Claims, 11 Drawing Sheets

(56) References Cited

PUBLICATIONS

Apple Japan, "Buy additional app features with in-app purchases and subscriptions", [online], searched on Mar. 30, 2020, Internet, URL: https://support.apple.com/ja-jp/HT202023 (3 pages), with English-language translation from URL: https://support.apple.com/enus/HT202023 (3 pages).

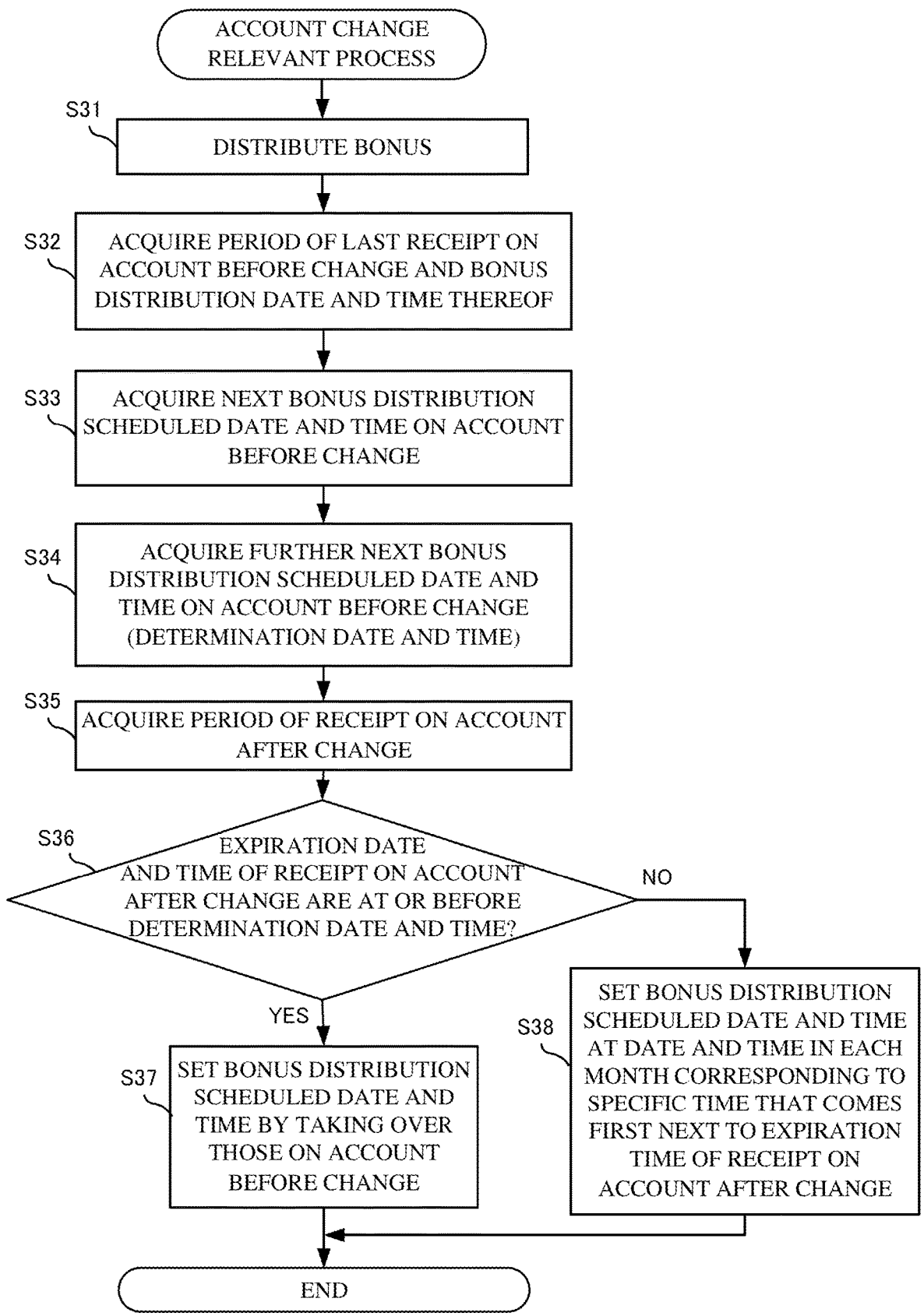

INFORMATION PROCESSING SYSTEM, INFORMATION PROCESSING APPARATUS, COMPUTER-READABLE NON-TRANSITORY STORAGE MEDIUM HAVING STORED THEREIN INFORMATION PROCESSING PROGRAM, AND INFORMATION PROCESSING METHOD

CROSS REFERENCE TO RELATED APPLICATION

This application claims priority to Japanese Patent Application No. 2020-071806 filed on Apr. 13, 2020, the entire contents of which are incorporated herein by reference.

FIELD

The exemplary embodiments relate to an information processing system and the like for executing an application.

BACKGROUND AND SUMMARY

Conventionally, it has been known that a user ID set every time a predetermined application is installed and an account (account ID) for using various services provided by a predetermined platformer, are associated with each other to be used. Further, it has been known that a content is provided by signing up for a predetermined subscription service on each account.

In the subscription service as described above, processing is needed when the account registered for the subscription service is associated with a user ID of another terminal.

Therefore, an object of the exemplary embodiments is to provide an information processing system and the like that enable appropriate processing when an account registered for a subscription service is associated with a user ID of another terminal.

Configuration examples for achieving the above object will be shown below.

One configuration example is an information processing system including a processor and a memory coupled thereto, the processor being configured to control the information processing system to at least: execute an application on the basis of data associated with each user ID; determine whether or not a periodic service with a valid registration period set therefor is registered on an account ID associated with the user ID; in a case where change processing is performed so that the account ID associated with the user ID is changed from a first account ID on which the periodic service is not registered to a second account ID on which the periodic service is registered, if the periodic service had been registered on the first account ID at or before an execution timing of the change processing, determine a first valid registration period which is the valid registration period of the periodic service having been registered on the first account ID; determine a first distribution timing which is a distribution timing that allows provision of an in-game item corresponding to the first valid registration period on the application; acquire a second distribution timing which is a distribution timing next to the first distribution timing, and a third distribution timing which is a distribution timing next to the second distribution timing; determine a second valid registration period which is the valid registration period of the periodic service associated with the second account ID; if a timing at which the second valid registration period expires is at or before the third distribution timing, determine, as the third distribution timing, a post-change distribution timing which is a distribution timing for a first time after the execution timing of the change processing, or if the timing at which the second valid registration period expires is after the third distribution timing, determine the post-change distribution timing in accordance with the second valid registration period; and provide an in-game item on the application at both of timings from the first distribution timing onward and from the post-change distribution timing onward.

According to the above configuration example, in a case where, in a state of having withdrawn from the periodic service, processing of replacement (account change) with another account on which the user is subscribing to the periodic service is performed, it is possible to appropriately set an in-game item distribution timing in consideration of the expiration timing of a valid registration period set by the above replacement processing.

In another configuration example, the post-change distribution timing may be determined to be a predetermined timing which is determined in accordance with an expiration timing of the second valid registration period and which is at or after the expiration timing.

According to the above configuration example, it is possible to determine the post-change distribution timing in accordance with the expiration timing of the valid registration period on the replaced account.

In another configuration example, only if the second valid registration period that has expired is continuously updated to be a new one as the second valid registration period, the in-game item may be provided on the application from the post-change distribution timing onward.

According to the above configuration example, it is possible to provide a motivation to newly update the valid registration period after the account replacement.

In another configuration example, the post-change distribution timing may be determined to be a predetermined time that comes first at or after the expiration timing of the second valid registration period.

According to the above configuration example, since in-game item distribution is performed at a predetermined time that comes first at or after the expiration timing of the second valid registration period, it is possible to increase a motivation to newly update the valid registration period.

In another configuration example, the first distribution timing may be determined to be a predetermined time that comes first at or after a start timing of the first valid registration period.

According to the above configuration example, since in-game item distribution is performed at an early stage at or after the start timing of the first valid registration period, it is possible to increase motivations for subscribing to the periodic service, and the like.

In another configuration example, the in-game item may be provided on the application at the execution timing of the change processing.

According to the above configuration example, an in-game item is distributed also in the valid registration period when the account is replaced, whereby an in-game item is distributed for each valid registration period.

In another configuration example, in a case where, when the first valid registration period has expired, the first valid registration period is updated, the updated first valid registration period may be determined to be a period having a same length as the expired first valid registration period.

In another configuration example, the period having the same length may be one month.

According to the above configuration example, it is possible to provide the first valid registration period that is easy for the user to understand.

In another configuration example, the second valid registration period may be determined to be a period having a same length as the first valid registration period.

According to the above configuration example, since the first valid registration period is the same between before and after the account replacement, it is possible to provide the valid registration period that is easy for the user to understand.

According to the exemplary embodiments, it is possible to provide an information processing system and the like that enable appropriate processing when an account registered on a subscription service is associated with a user ID of another terminal.

BRIEF DESCRIPTION OF THE DRAWINGS

FIG. 13 is a non-limiting example of a flowchart showing the details of an account change relevant process for the subscription service (periodic service).

DETAILED DESCRIPTION OF NON-LIMITING EXAMPLE EMBODIMENTS

Figure 1:
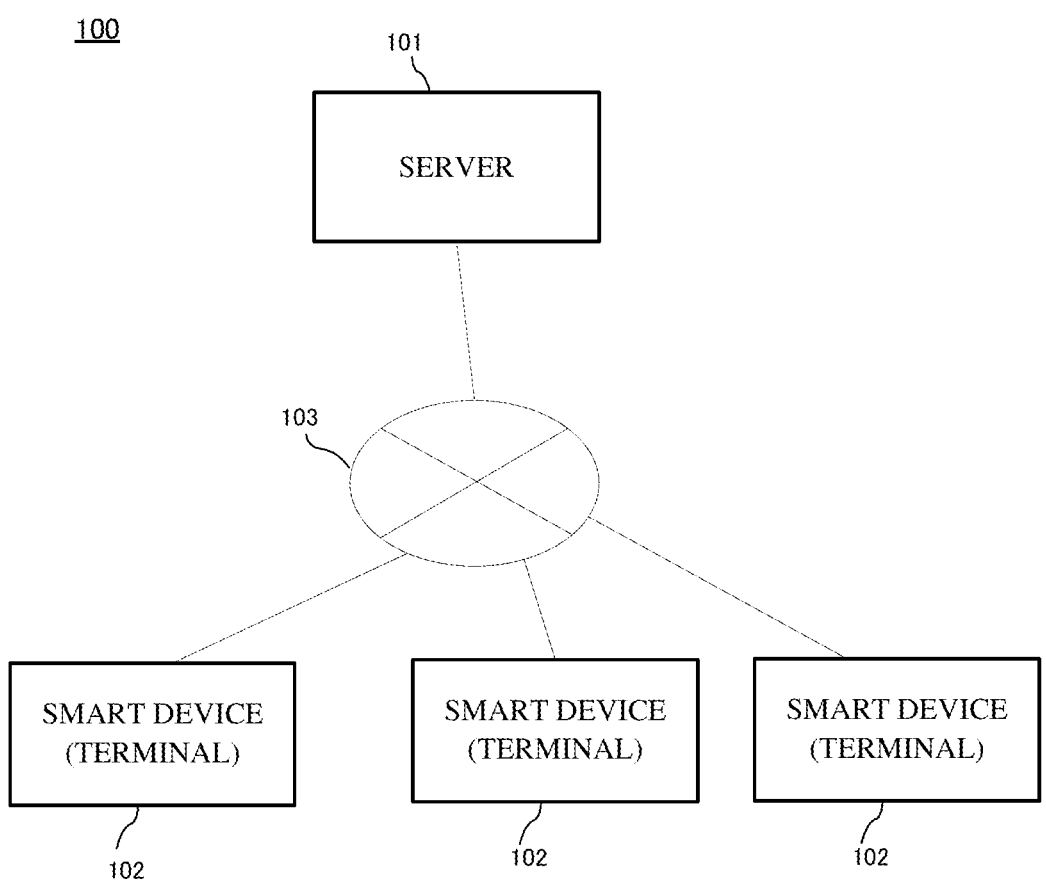
FIG. 1 is a schematic diagram showing a non-limiting example of the entire configuration of an information processing system according to one exemplary embodiment.

Hereinafter, one exemplary embodiment will be described. It is to be understood that, as used herein, elements and the like written in the singular form with the word "a" or "an" attached before them do not exclude those in the plural form. FIG. 1 is a schematic diagram showing the entire configuration of an information processing system according to the exemplary embodiment. An information processing system 100 of the exemplary embodiment includes a server 101 and a plurality of terminals 102. In the exemplary embodiment, a smart device is assumed as an example of the terminal 102. In the exemplary embodiment, a hand-held information processing terminal such as a smartphone or a tablet apparatus is assumed as an example of the smart device 102. However, the processing of the exemplary embodiment can be applied to stationary smart devices. The server 101 and the smart devices 102 are configured so as to be communicable with each other via the Internet 103.

In the exemplary embodiment, information processing is executed under the above configuration, and hereinafter, as an example of the information processing, game processing will be described. Specifically, a game program (game application) is installed on a smart device, and the game processing is executed while the smart device communicates with the server 101 as appropriate. In the game processing according to the exemplary embodiment, data indicating the play status of a user (player) is stored in the server 101. The data indicating the play status is, for example, data indicating information about a player character operated by the user, the progress status of the game, possessed items, and the like, and corresponds to, as an example, saved data 311 described later. For example, at the start of the game, log-in processing to the server 101 is performed, the saved data 311 indicating the play status of the user is acquired from the server 101 onto the smart device 102, and the game processing is executed on the basis of the saved data 311.

[Hardware Configuration of Server]

Figure 2:
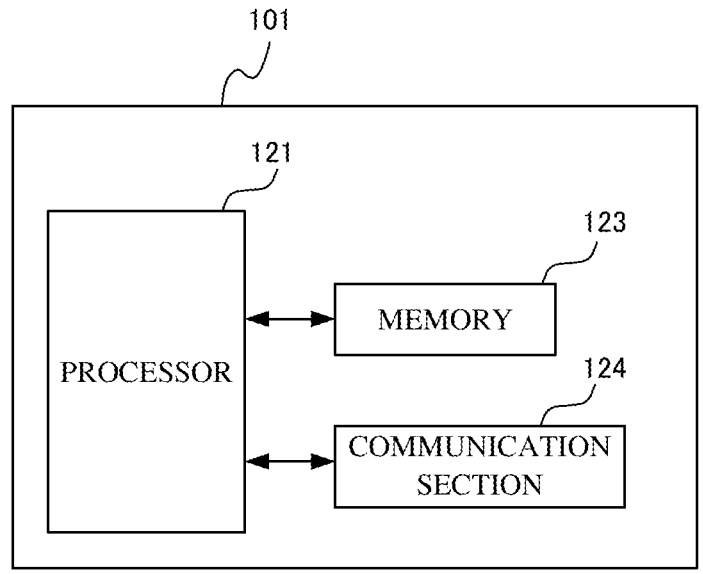
FIG. 2 is a block diagram showing a non-limiting example of the configuration of a server 101.

Next, the hardware configuration of the server 101 will be described. FIG. 2 is a functional block diagram of the server 101. The server 101 at least includes a processor 121, a memory 123, and a communication section 124. The processor 121 executes various kinds of programs for controlling the server 101. Various kinds of programs to be executed and various kinds of data to be used by the processor 121 are stored in the memory 123. The communication section 124 is connected to a network (Internet 103) via wired or wireless communication, and transmits/receives predetermined data to/from the smart devices 102 or another server (not shown).

[Hardware Configuration of Smart Device]

Figure 3:
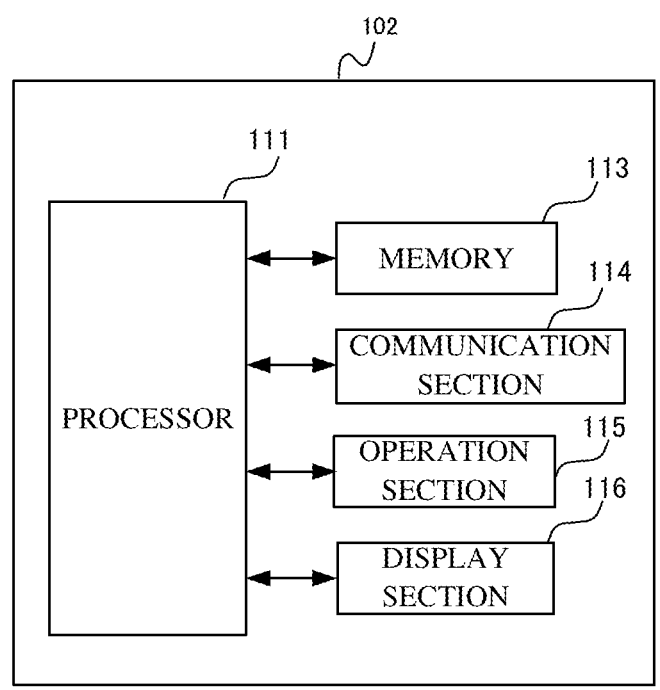
FIG. 3 is a block diagram showing a non-limiting example of the configuration of a smart device (terminal) 102.

Next, the configuration of each hardware configuration in the above system will be described. FIG. 3 is a functional block diagram of the smart device 102. In FIG. 3, the smart device 102 at least includes a processor 111, a memory 113, a communication section 114, an operation section 115, and a display section 116. The processor 111 executes later-described information processing or executes a system program (not shown) for controlling overall operation of the smart device 102, thereby controlling operation of the smart device 102. The processor 111 may include a single processor or a plurality of processors. In the memory 113, various programs to be executed by the processor 111 and various kinds of data to be used in the programs are stored. The memory 113 is, for example, a flash EEPROM or a hard disk device. The communication section 114 is connected to the network via wired or wireless communication, and transmits/receives predetermined data to/from the server 101. The operation section 115 is an input device for receiving an operation from a user, for example. The display section 116 is typically a liquid crystal display device. In the processing according to the exemplary embodiment, the operation section 115 and the display section 116 are each assumed to be a touch panel integrated with a liquid crystal screen. In another exemplary embodiment, the operation section 115 may be a predetermined pointing device other than the touch panel. In the following description, the smart device 102 may be referred to as "terminal 102".

[Outline of Information Processing in the Exemplary Embodiment]

Next, the outline of the information processing executed in the exemplary embodiment will be described. In the exemplary embodiment, game processing will be described as an example of the information processing. In particular, the exemplary embodiment relates to processing performed in a case where the user subscribes to (signs up for) a subscription service on a game application installed on the terminal 102 and receives provision (distribution) of a bonus. Specifically, the exemplary embodiment relates to processing of distributing a bonus in a case where the user once withdraws from a subscription service and subscribes again or in a case where the user changes an account (account ID) associated with a user ID set for a game application installed on the terminal 102, to another account (account ID), for example. Hereinafter, changing the account associated with the user ID to another account as described above may be referred to as "account replacement".

Figure 4:
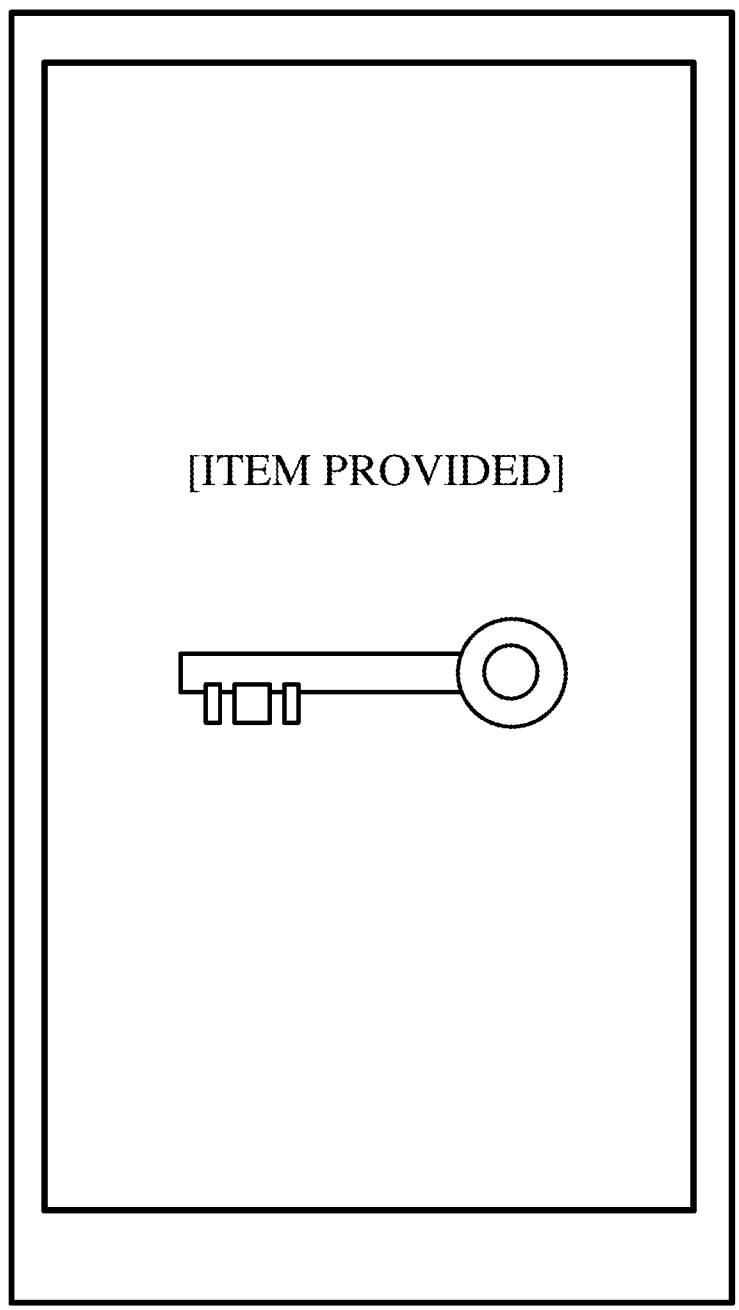
FIG. 4 shows a non-limiting example of a game screen at the time of bonus distribution.

In a game assumed in the exemplary embodiment, the user can subscribe to (sign up for) a subscription service (hereinafter, may be referred to as "periodic service") based on monthly charge, and can periodically receive, as a bonus, provision (distribution) of an item that can be used in the game in the exemplary embodiment. FIG. 4 shows, as an example, a case where an item of a key is provided as a bonus in this game and an image in which the item is received in the game by the user performing a predetermined operation (e.g., operation of receiving the item from a postbox in the game) is displayed on a display section of the terminal 102.

Here, the relationship among the terminal 102, the game application, the user ID, the account ID, and the subscription service (periodic service), will be described. The user ID is an ID set when the game application of this game is installed on the terminal 102, and is associated with the installed game application. The account ID is an ID used for accessing a platform that provides a service or the like, and using the service or the like, and is one-by-one associated with the user ID associated with the game application of this game installed on the terminal 102. Then, the subscription service (periodic service) is one of services provided from the platform, and is provided in association with the account ID.

First, the periodic service in the exemplary embodiment will be described. A user who plays this game on the terminal 102 can subscribe to the periodic service in the exemplary embodiment, and as a bonus of the periodic service, an item (bonus) that can be used in the game is periodically provided. The periodic service in the exemplary embodiment is a periodic service based on monthly charge, and terminates by the user going through a predetermined withdrawal procedure (including a case of automatically withdrawing as a result of not paying a monthly charge).

Figure 5:
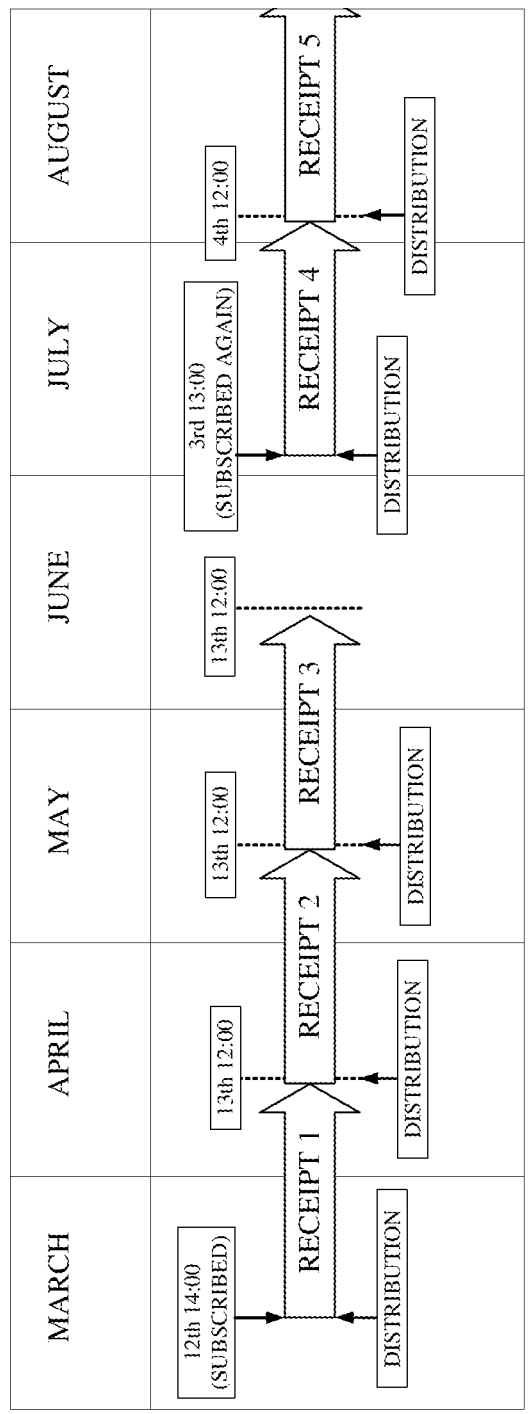
FIG. 5 is a chart illustrating a non-limiting example of a first bonus distribution rule in the exemplary embodiment.

FIG. 5 is a chart illustrating a first bonus distribution rule in the periodic service in the exemplary embodiment. As shown in FIG. 5, when the user subscribes to the periodic service, a receipt for one month indicating that registration for the periodic service is valid (namely, a receipt indicating a valid registration period of one month), is set, and if a withdrawal procedure is not taken, the receipt is updated and the periodic service continues. On the other hand, if a withdrawal procedure is taken during the receipt period (in which the receipt is being set), the periodic service terminates when the receipt period expires.

Hereinafter, with reference to FIG. 5, specific description will be given. In FIG. 5, a case where a procedure of subscribing to the periodic service is completed at 14:00 on March 12, is assumed as an example. In the exemplary embodiment, the date and time are represented by Coordinated Universal Time (UTC). As shown in FIG. 5, when a procedure of subscribing to the periodic service is completed at 14:00 on March 12, a receipt 1 for one month from 14:00 on March 12 to 14:00 on April 12 is set, and further, a bonus is distributed at the time of completion of the subscription procedure. In addition, the date and time corresponding to a predetermined specific time (12:00) that comes first next to the expiration time (14:00) of the receipt 1, are set as scheduled date and time at which a bonus (item; see FIG. 4) is distributed. More specifically, in a case where the expiration time of the receipt 1 is before the next predetermined specific time that comes first as described above, the specific time in each month corresponding to the date of the expiration day of the receipt 1 is set as bonus distribution scheduled date and time. On the other hand, in a case where the expiration time of the receipt 1 is at or after the next predetermined specific time that comes first as described above, the specific time in each month corresponding to the date next to the expiration day of the receipt 1 is set as bonus distribution scheduled date and time. In the example in FIG. 5, 12:00 on 13th in each month of April and subsequent months is set as bonus distribution scheduled date and time. Then, as shown in FIG. 5, if a withdrawal procedure is not taken during the period of the receipt 1, the receipt is updated at the time when the period of the receipt 1 expires, and a receipt 2 for one month from 14:00 on April 12 to 14:00 on May 12 is set. In this case, at the bonus distribution scheduled date and time, i.e., 12:00 on April 13, the receipt has been set, and therefore a bonus is distributed at the above date and time. Then, as shown in FIG. 5, if a withdrawal procedure is not taken during the period of the receipt 2, the receipt is updated at the time when the period of the receipt 2 expires, and a receipt 3 for one month from 14:00 on May 12 to 14:00 on June 12 is set. In this case, at the bonus distribution scheduled date and time, i.e., 12:00 on May 13, the receipt has been set, and therefore a bonus is distributed at the above date and time. Then, as shown in FIG. 5, if a withdrawal procedure is taken during the period of the receipt 3, the receipt is not updated at the time when the period of the receipt 3 expires. In this case, as shown in FIG. 5, at the bonus distribution scheduled date and time, i.e., 12:00 on June 13, the receipt has not been set, and therefore a bonus is not distributed at the above date and time.

Thereafter, as shown in FIG. 5, if a procedure of subscribing to the periodic service again is completed at 13:00 on July 3, a receipt 4 for one month from 13:00 on July 3 to 13:00 on August 3 is set, and a bonus is distributed at the time when the procedure of subscribing again is completed. In addition, the date and time corresponding to the predetermined specific time (12:00) that comes first next to the expiration time (13:00) on the expiration day of the receipt 4 are set as bonus distribution scheduled date and time. In the example in FIG. 5, 12:00 on 4th in each month of August and the subsequent months is set as bonus distribution scheduled date and time. Then, as shown in FIG. 5, if a withdrawal procedure is not taken during the period of the receipt 4, the receipt is updated at the time when the period of the receipt 4 expires, and a receipt 5 for one month from 13:00 on August 3 to 13:00 on September 3 is set. In this case, at the bonus distribution scheduled date and time, i.e., 12:00 on August 4, the receipt has been set, and therefore a bonus is distributed on the above date and time. Hereafter, similarly, as long as the receipt is updated and set without a withdrawal procedure being taken, a bonus is distributed at the predetermined specific time (12:00) on 4th in each month.

As described above, in the periodic service in the exemplary embodiment, a receipt for one month from the time when the subscription procedure is completed, is set, and if a withdrawal procedure is not taken during the period of the receipt, the receipt is updated for another one month at the time when the receipt expires, and the periodic service continues. On the other hand, if a withdrawal procedure is taken during the period of the receipt, the receipt is not newly updated at the time when the receipt expires, and the periodic service terminates. In addition, according to the first bonus distribution rule in the periodic service in the exemplary embodiment, a bonus is distributed at the time when the subscription procedure is completed, and further, a bonus is distributed at the predetermined specific time that comes first at or after the start time of a new receipt updated subsequent to the receipt with which the former bonus was distributed. In this way, according to the first bonus distribution rule in the periodic service in the exemplary embodiment, a bonus can be distributed once per receipt for one month.

Figure 6:
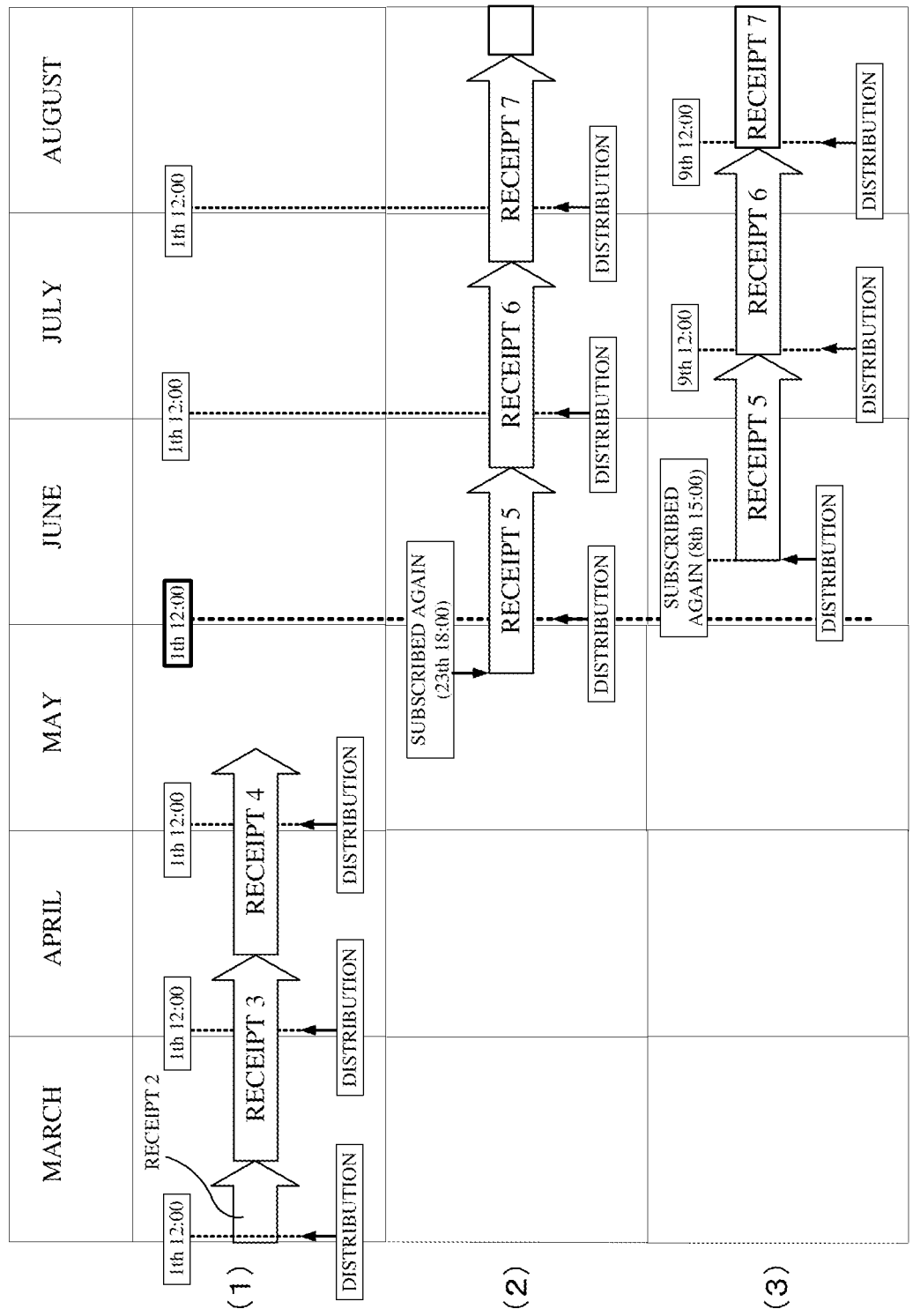
FIG. 6 is a chart illustrating a non-limiting example of change of a bonus distribution rule in a case of subscribing again to a subscription service (periodic service) in the exemplary embodiment.

FIG. 6 is a chart illustrating an example of change of a bonus distribution rule in a case of withdrawing from the periodic service in the exemplary embodiment once and then subscribing again. In FIG. 6, a case where a withdrawal procedure is taken while bonus distribution is performed under a second bonus distribution rule in the periodic service and thereafter a procedure of subscribing again is taken, is assumed. Hereinafter, a specific description will be given with reference to FIG. 6. Also in the case where bonus distribution is performed under the second bonus distribution rule, setting and update of a receipt are performed in the same manner as in the case where bonus distribution is performed under the first bonus distribution rule described with reference to FIG. 5.

First, the second bonus distribution rule will be specifically described. In (1) of FIG. 6, a case where a procedure of subscribing to the periodic service has been completed at 14:00 on January 12 (not shown) is assumed as an example. In this case, during four months from 14:00 on January 12 to 14:00 on May 12, a receipt for one month is updated three times, so that a receipt 1 (not shown), a receipt 2, a receipt 3, and a receipt 4 are set. As shown in (1) of FIG. 6, in the second bonus distribution rule, predetermined specific date and time (12:00 on 1st in each month) in each month are set as a scheduled date for distributing a bonus (item; see FIG. 4). Thus, as shown in (1) of FIG. 6, a bonus is distributed at 12:00 on 1st in each month from February to April. Then, a withdrawal procedure is taken during the period of the receipt 4.

While bonus distribution is performed under the second bonus distribution rule as described above, it is assumed that the user once withdraws from the periodic service and then subscribes again. Hereinafter, bonus distribution in this case will be described. First, in a case where a procedure of subscribing again is completed at or before the bonus distribution scheduled date and time (June 1, 12:00) next to the bonus distribution date and time (May 1, 12:00) of the receipt 4 in (1) of FIG. 6 in which the periodic service has once terminated, bonus distribution is to be performed under the second bonus distribution rule as shown in (2) of FIG. 6. That is, as shown in (2) of FIG. 6, if a receipt has been set at the bonus distribution scheduled date and time (12:00 on 1st in each month), a bonus is distributed at each bonus distribution scheduled date and time. Here, since the timing for subscribing again is at or before the next bonus distribution scheduled date and time (June 1, 12:00), a bonus is distributed at said date and time in the receipt 5, and therefore bonus distribution is not performed at the time of subscribing again. It is noted that the date and time when the procedure of subscribing again is completed in (2) of FIG. 6 are May 23, 18:00, as an example.

On the other hand, in a case where a procedure of subscribing again is completed after the bonus distribution scheduled date and time (June 1, 12:00) next to the bonus distribution date and time (May 1, 12:00) in the receipt 4 in (1) of FIG. 6 in which the periodic service has once terminated, bonus distribution is performed under the first bonus distribution rule described with reference to FIG. 5, as shown in (3) of FIG. 6. That is, as shown in (3) of FIG. 6, a bonus is distributed at the time when the procedure of subscribing (again) is completed, and then a bonus is distributed at the predetermined specific time (12:00) that comes first at or after the start time of each receipt updated subsequent to the receipt with which the former bonus was distributed. In (3) of FIG. 6, at 15:00 on June 8, the procedure of subscribing again is completed, and at the time when this procedure is completed, a bonus is distributed and a receipt 5 for one month is set. Thereafter, the receipt is updated, so that a receipt 6 and then a receipt 7 are set. Then, during the periods of the receipt 6 and the receipt 7, a bonus is distributed at the predetermined specific time (12:00) on each day (July 9 and August 9) corresponding to the day next to the expiration day (July 8) of the receipt 5.

As described above, in the exemplary embodiment, in a case of withdrawing from the periodic service while the second bonus distribution rule is applied to the periodic service, and then subscribing again in a comparatively short period from the withdrawal, application of the second bonus distribution rule continues, and on the other hand, in a case of subscribing again after a comparatively long period from the withdrawal, the first bonus distribution rule is applied. Thus, in the exemplary embodiment, it is possible to change the bonus distribution rule appropriately in accordance with the period until subscribing again after withdrawal from the periodic service.

In the above description, whether to apply the first bonus distribution rule or the second bonus distribution rule is determined with the bonus distribution scheduled date and time (i.e., "time") as a boundary. However, in another exemplary embodiment, whether to apply the first bonus distribution rule or the second bonus distribution rule may be determined with a "date" as a boundary. Specifically, control may be performed such that, in a case where a procedure of subscribing again is completed at or before the bonus distribution scheduled date (June 1) next to the bonus distribution date (May 1) in the receipt 4 in (1) of FIG. 6 in which the periodic service has once terminated, bonus distribution is performed under the second bonus distribution rule as shown in (2) of FIG. 6, and on the other hand, in a case where a procedure of subscribing again is completed after the next bonus distribution scheduled date (June 1) described above, bonus distribution is performed under the first bonus distribution rule as shown in (3) of FIG. 6.

Figure 7:
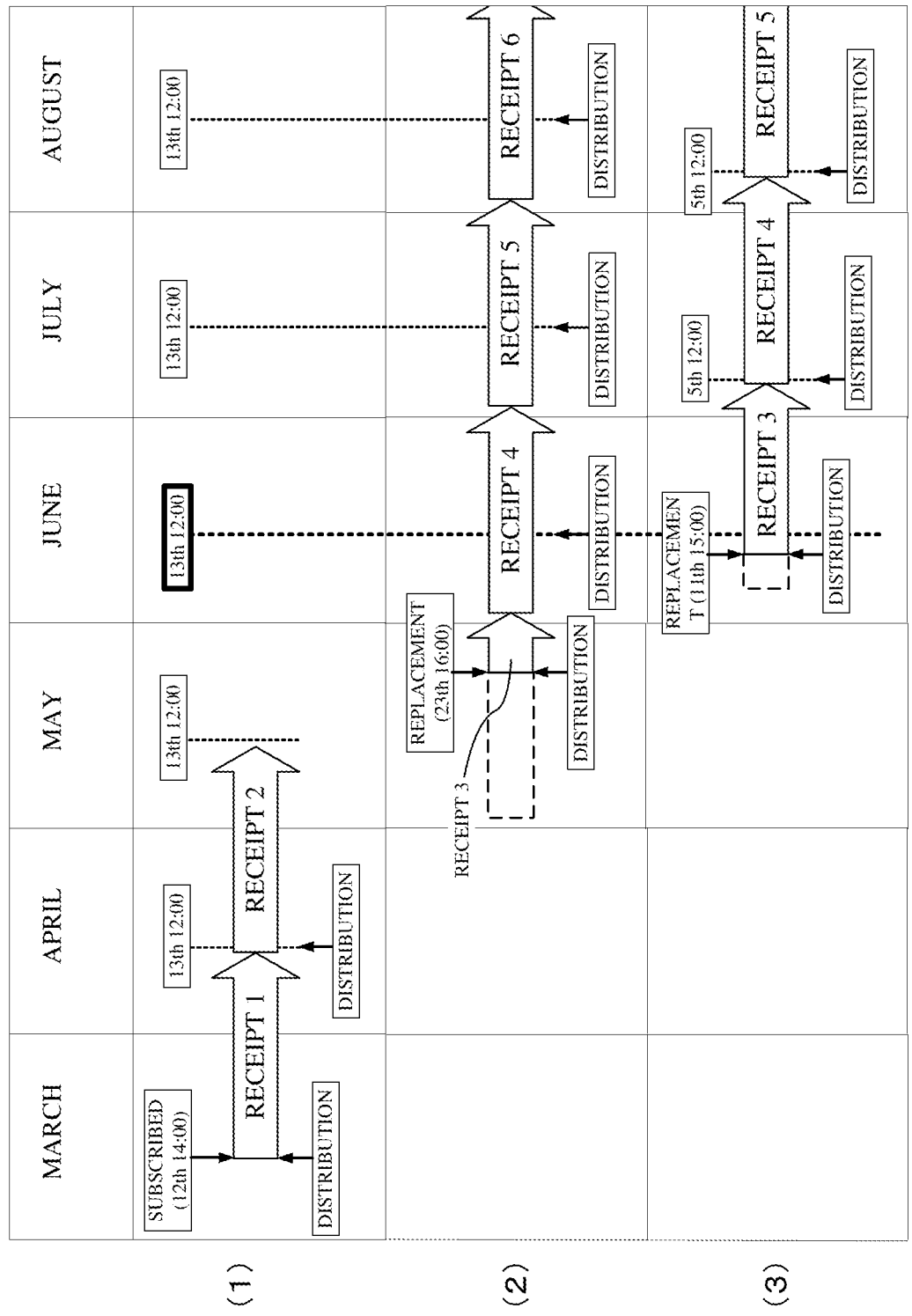
FIG. 7 is a chart illustrating a non-limiting example of change of bonus distribution scheduled date and time in a case of changing an account in a subscription service (periodic service) in the exemplary embodiment.

FIG. 7 is a chart illustrating an example of change of bonus distribution scheduled date and time in a case of replacing the account in the periodic service in the exemplary embodiment. In FIG. 7, a case where a withdrawal procedure is taken while bonus distribution is performed under the first bonus distribution rule in the periodic service, and thereafter a procedure of replacing the account is taken, is assumed.

First, an assumed situation will be described. It is assumed that, on a first terminal 102, the game application in the exemplary embodiment is installed and a first user ID is set, a first account ID is one-by-one associated with the first user ID, and the periodic service in the exemplary embodiment is provided in association with the first account ID. In addition, it is assumed that, on a second terminal 102, this game application is installed and a second user ID is set, a second account ID is one-by-one associated with the second user ID, and the periodic service is provided in association with the second account ID.

Hereinafter, a specific description will be given with reference to FIG. 7. As shown in (1) of FIG. 7, in a case where a procedure of subscribing to the periodic service in association with the first account ID is completed on the first terminal 102 at 14:00 on March 12, a receipt 1 for one month from 14:00 on March 12 to 14:00 on April 12 is set, and a bonus is distributed at the time when the subscription procedure is completed. In addition, as described above with reference to FIG. 5, the date and time corresponding to the predetermined specific time (12:00) that comes first next to the expiration time (14:00) of the receipt 1 are set as scheduled date and time for distributing a bonus (item; see FIG. 4). That is, as shown in (1) of FIG. 7, 12:00 on 13th in each month of April and the subsequent months is set as bonus distribution scheduled date and time. Then, as shown in (1) of FIG. 7, if a withdrawal procedure is not taken during the period of the receipt 1, the receipt is updated at the time when the period of the receipt 1 expires, and a receipt 2 for one month from 14:00 on April 12 to 14:00 on May 12 is set. In this case, at the bonus distribution scheduled date and time, i.e., 12:00 on April 13, the receipt has been set, and therefore a bonus is distributed at the above date and time. Then, as shown in (1) of FIG. 7, if a procedure of withdrawing from the periodic service is taken during the period of the receipt 2, the receipt is not updated at the time when the period of the receipt 2 expires. In this case, as shown in (1) of FIG. 7, at the bonus distribution scheduled date and time, i.e., 12:00 on May 13, the receipt has not been set, and therefore a bonus is not distributed at the above date and time.

After the periodic service that has been provided in association with the first account ID associated with the first user ID on the first terminal 102 has terminated as described above, it is assumed that an account replacement procedure is taken so that the second account ID associated with the periodic service that has been provided on the second terminal 102 is associated with the first user ID on the first terminal 102. Hereinafter, bonus distribution in this case will be described.

First, in a case where a receipt 3 set by the account replacement described above expires at or before the next bonus distribution scheduled date and time (June 13, 12:00) after the next to the bonus distribution date and time (April 13, 12:00) of the receipt 2 in (1) of FIG. 7 in which the periodic service has once terminated, a bonus is distributed in the game executed on the first terminal 102 at the time when the account replacement procedure is completed (May 23, 16:00) as shown in (2) of FIG. 7. Thereafter, if a procedure of withdrawing from the periodic service is not taken, a bonus is distributed in the game executed on the first terminal 102 at the bonus distribution scheduled date and time (13th, 12:00) in each month as described with reference to (1) of FIG. 7.

On the other hand, in a case where the receipt 3 set by the account replacement described above expires after the next bonus distribution scheduled date and time (June 13, 12:00) after the next to the bonus distribution date and time (April 13, 12:00) of the receipt 2 in (1) of FIG. 7 in which the periodic service has once terminated, a bonus is distributed in the game executed on the first terminal 102 at the time when the account replacement procedure is completed (June 11, 15:00) as shown in (3) of FIG. 7. Thereafter, if a procedure of withdrawing from the periodic service is not taken, the date and time corresponding to the predetermined specific time (12:00) that comes first next to the expiration time of the receipt 3 shown in (3) of FIG. 7 are set as bonus distribution scheduled date and time. In the example in (3) of FIG. 7, 12:00 on 5th in each month of July and the subsequent months is set as bonus distribution scheduled date and time.

Here, in the receipt 3 in (2) and (3) of FIG. 7, a broken line part represents a receipt part set for the game executed on the second terminal 102, and a solid line part represents a receipt part newly set for the game executed on the first terminal 102 as a result of the account replacement processing (account change processing).

As described above, in the exemplary embodiment, in a case where the user has withdrawn from the periodic service while the first bonus distribution rule is applied in the periodic service, and then the receipt set by the account replacement expires in a comparatively short period from the withdrawal, a bonus is distributed at the time when the account replacement procedure is completed, and further, a bonus is distributed at the bonus distribution scheduled date and time that had been set before the account replacement procedure. On the other hand, in a case where the receipt set by the account replacement expires after elapse of a comparatively long period from the withdrawal, a bonus is distributed at the time when the account replacement procedure is completed, and thereafter, a bonus is distributed at the date and time in each month corresponding to the predetermined specific time that comes first next to the expiration time of the above receipt. Thus, in the exemplary embodiment, it is possible to change the bonus distribution scheduled date and time appropriately in accordance with the period until expiration of the receipt set by account replacement from withdrawal from the periodic service.

In the above description, bonus distribution control is made different with the bonus distribution scheduled date and time (i.e., "time") as a boundary. However, in another exemplary embodiment, bonus distribution control may be made different with the "date" as a boundary. Specifically, control may be performed such that, in a case where the receipt 3 set by the account replacement expires at or before the next bonus distribution scheduled date (June 13) after the next to the bonus distribution date (April 13) of the receipt 2 in (1) of FIG. 7 in which the periodic service has once terminated, bonus distribution is performed by the bonus distribution method described with reference to (2) of FIG. 7, and on the other hand, in a case where the receipt 3 set by the account replacement expires after the above next bonus distribution scheduled date (June 13), bonus distribution is performed by the bonus distribution method described with reference to (3) of FIG. 7.

[Details of Information Processing in the Exemplary Embodiment]

Figure 9:
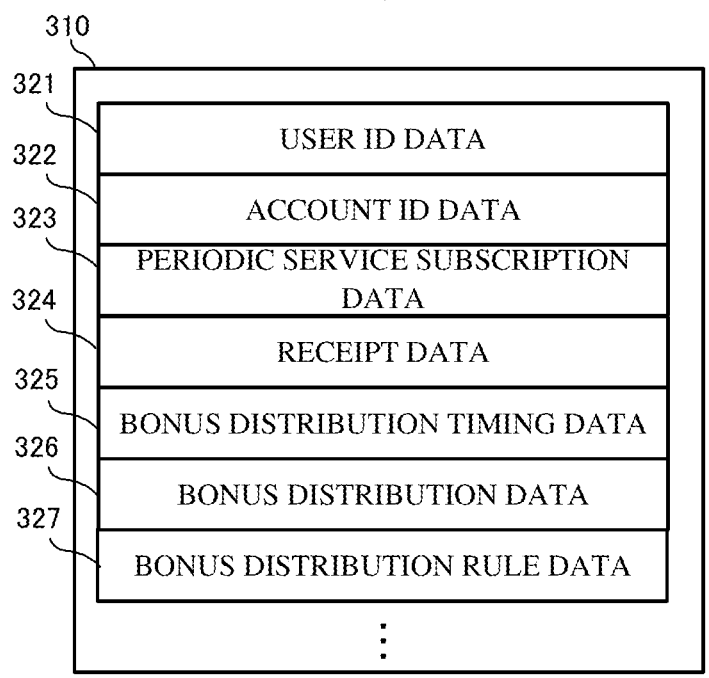
FIG. 9 shows a non-limiting example of the data structure of account relevant data 310.
Figure 10:
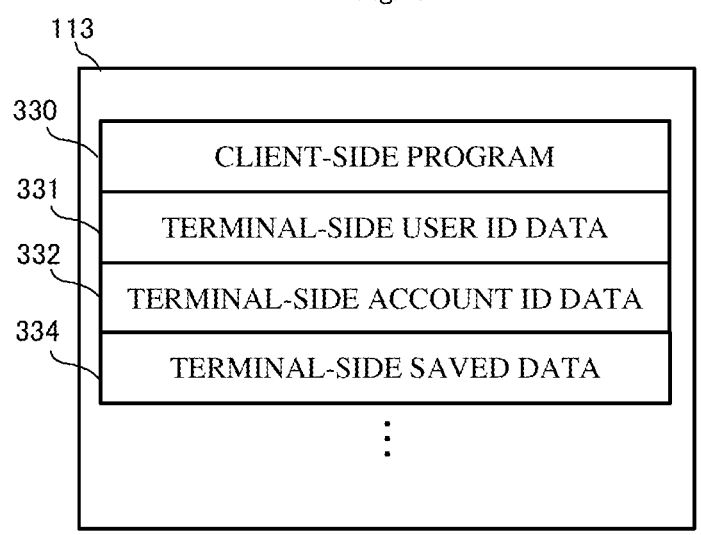
FIG. 10 shows a non-limiting example of a program and data stored in a memory 113 of a smart device (terminal) 102.

Next, with reference to FIG. 8 to FIG. 10, the information processing in the exemplary embodiment will be described in more detail.

[Used Data]

First, various types of data used in the information processing will be described. FIG. 8 shows an example of a program and data stored in the memory 123 of the server 101. The memory 123 stores a server-side program 301 and a user database 302.

The server-side program 301 is a program for causing the server 101 to execute various functions assigned to the server side in the game processing according to the exemplary embodiment.

The user database 302 is a database in which information about users of the game according to the exemplary embodiment is stored, and includes a plurality of user data 303. Each user data 303 includes account relevant data 310, saved data 311, and the like.

The account relevant data 310 is information relevant to the account of each user. FIG. 9 shows an example of the structure of the account relevant data 310. As shown in FIG. 9, the account relevant data 310 includes user ID data 321, account ID data 322, periodic service subscription data 323, receipt data 324, bonus distribution timing data 325, bonus distribution data 326, bonus distribution rule data 327, and the like.

The user ID data 321 is information indicating a user ID generated when the game is started for the first time after the game application according to the exemplary embodiment is installed on the terminal 102.

The account ID data 322 is information indicating an account ID which is used for accessing a platform providing a service and the like including the periodic service according to the exemplary embodiment and using the service and the like.

The periodic service subscription data 323 is information indicating a subscription history for the periodic service according to the exemplary embodiment and whether or not the user is subscribing to the periodic service.

The receipt data 324 is information indicating a setting history for a receipt (see FIG. 7, etc.) set by subscribing to the periodic service according to the exemplary embodiment, and whether or not the receipt is being set.

The bonus distribution timing data 325 is data relevant to bonuses distributed through subscription to the periodic service according to the exemplary embodiment, and information indicating the distribution date and time history and the distribution scheduled date and time for bonuses.

The bonus distribution data 326 is data relevant to bonuses distributed through subscription to the periodic service according to the exemplary embodiment, and information indicating a bonus distribution history.

The bonus distribution rule data 327 is data relevant to bonuses distributed through subscription to the periodic service according to the exemplary embodiment, and information indicating the history of application periods of the first bonus distribution rule and application periods of the second bonus distribution rule, and which of the bonus distribution rules is being applied.

The saved data 311 is information in which the play status, the progress status, and the like of the game for each user are saved.

Figure 8:
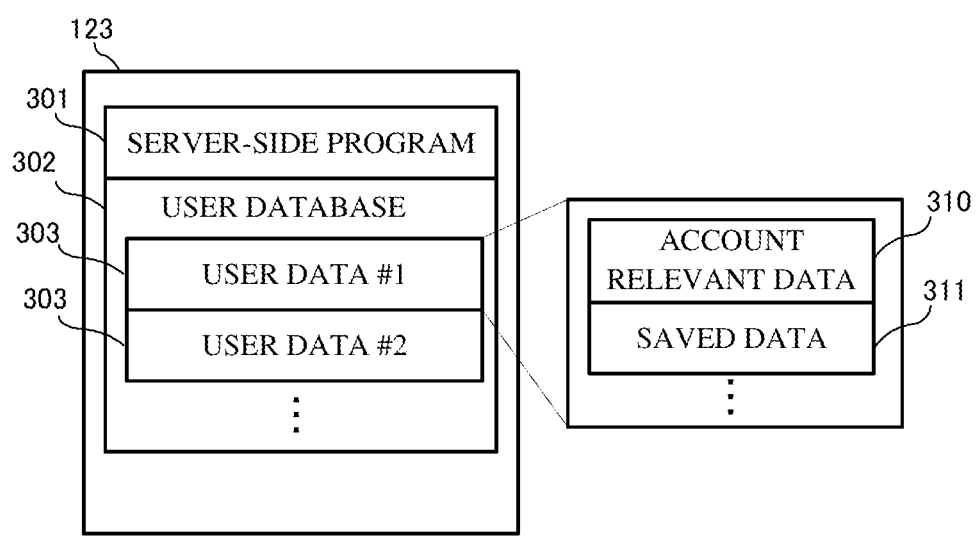
FIG. 8 shows a non-limiting example of a program and data stored in a memory 123 of the server 101.

The memory 123 shown in FIG. 8 also stores various other data needed for the game processing and the like, although not shown.

Next, data on the terminal 102 side will be described. FIG. 10 shows an example of a program and data stored in the memory 113 of the terminal 102. The memory 113 stores a client-side program 330, terminal-side user ID data 331, terminal-side account ID data 332, terminal-side saved data 334, and the like.

The client-side program 330 is a program for causing the smart device 102 to execute various functions assigned to the terminal 102 side in the information processing according to the exemplary embodiment.

The terminal-side user ID data 331 is generated and stored when the game is started for the first time after the game application according to the exemplary embodiment is installed on the terminal 102, and is shared as the user ID data 321 by the server 101 at a predetermined timing (e.g., when the game processing is started).

The terminal-side account ID data 332 is stored when this game is started for the first time, and is shared as the account ID data 322 by the server 101 at a predetermined timing (e.g., when the game processing is started). It is noted that the account ID is an ID that the user registers in advance for a platform in order to receive various services (also including services other than the periodic service and the game according to the exemplary embodiment) from the platform, and is also used for payment in a case of using a service or the like, for example.

As the terminal-side saved data 384, the saved data 311 is acquired from the server 101 and stored, when the game processing is started.

Other than the above, various data such as the periodic service subscription data 323, the receipt data 324, the bonus distribution timing data 325, the bonus distribution data 326, and the bonus distribution rule data 327 are acquired from the server 101 as necessary, and stored in the memory 113.

[Details of Example of Information Processing According to Exemplary Embodiment]

Next, the details of the information processing according to the exemplary embodiment will be described with reference to flowcharts. Here, processing relevant to the periodic service according to the exemplary embodiment will be described, while description of other processing (such as game processing) is omitted. Hereinafter, a case where mainly the processor 111 of the terminal 102 executes processing while acquiring data from the server 101 as necessary, will be described as an example. In another exemplary embodiment, a part of the following processing may be executed by the server 101 and a result thereof may be reflected in the processing on the terminal 102, or a part or the entirety of necessary data may be stored in the terminal 102.

It is noted that, in the processing on the server 101, log-in processing, transmission/reception processing of various data, and the like are performed as appropriate in accordance with a user's operation (request from the terminal 102), although not shown.

Figure 11:
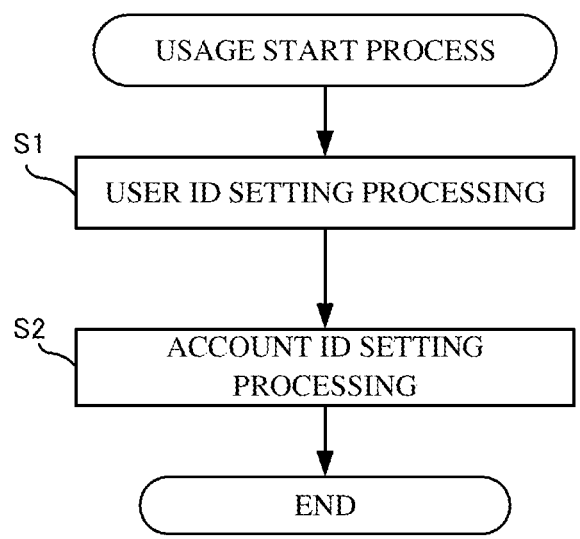
FIG. 11 is a non-limiting example of a flowchart showing the details of a usage start process.

First, a usage start process which is a process performed when this game is started for the first time on the terminal 102, will be described. This process is executed when this game is started for the first time and usage of the game is started, after processing of installing this game on the terminal 102 is completed, for example. FIG. 11 is an example of a flowchart showing the details of the usage start process. Hereinafter, a description will be given with reference to FIG. 11.

First, in step S1, the processor 111 executes user ID setting processing. Specifically, the processor 111 generates a user ID, stores the user ID as the terminal-side user ID data 331 in the memory 113, and registers the user ID as the user ID data 321 in the server 101. Thereafter, the process proceeds to step S2.

In step S2, the processor 111 executes account ID setting processing. Specifically, the processor 111 causes the user to input the account ID to be used for receiving the service from the platform which provides the service relevant to this game, and then, when registration of the account ID is confirmed on the platform, the processor 111 stores the account ID as the terminal-side account ID data 332 in the memory 113 and registers the account ID as the account ID data 322 in the server 101. It is noted that, after the account ID is set in step S2, for example, it is possible to purchase an item that can be used in this game, or the like. Then, the usage start process is finished, and subsequently, the game processing is started and thus the game is to be started.

Figure 12:
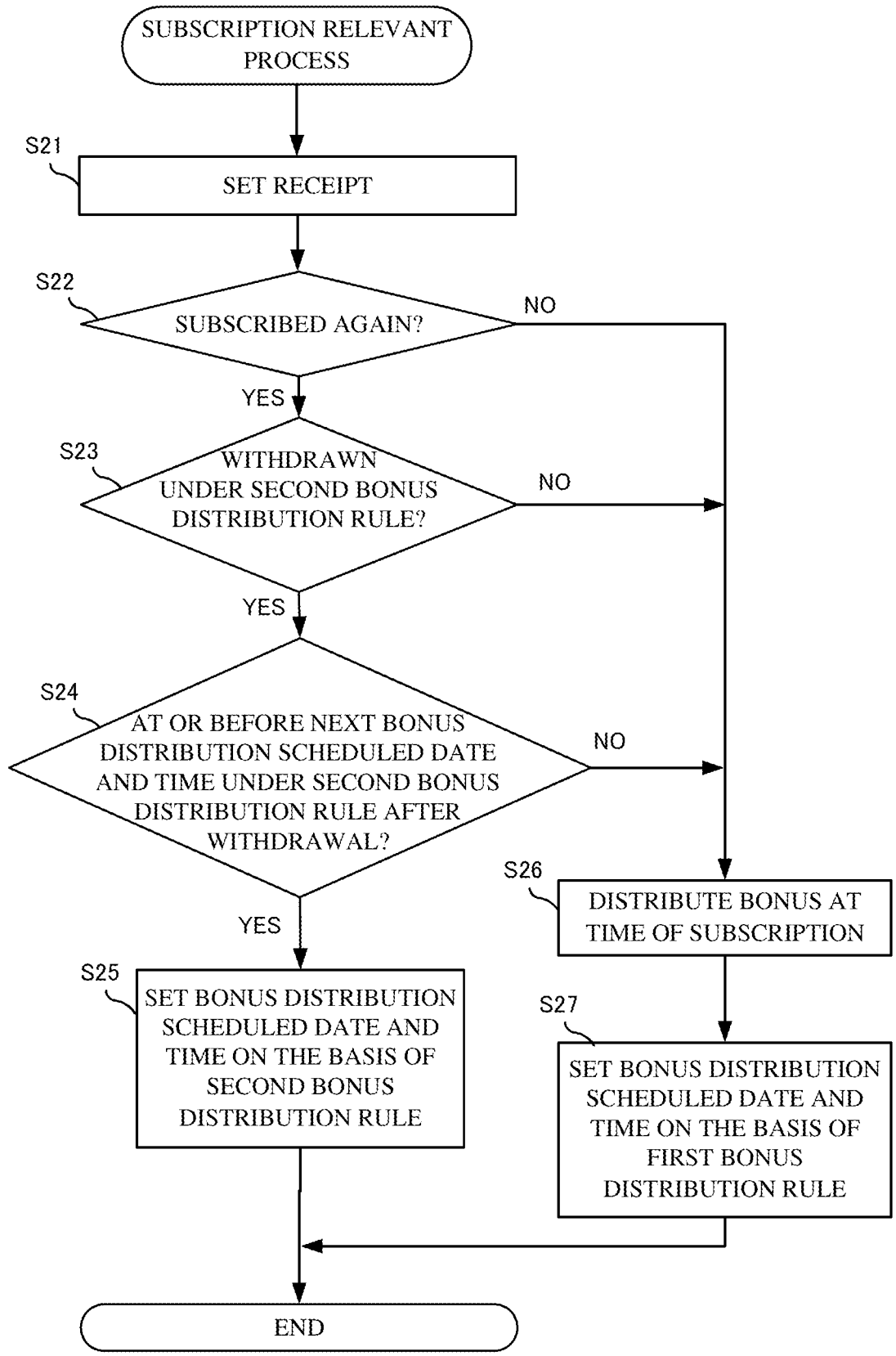
FIG. 12 is a non-limiting example of a flowchart showing the details of a subscription relevant process for a subscription service (periodic service)

FIG. 12 is an example of a flowchart showing the details of a subscription relevant process executed in a case of subscribing to the periodic service (including a case of subscribing again) described with reference to FIG. 5 and FIG. 6. The subscription relevant process is executed when an operation of subscribing to the periodic service (including an operation of subscribing again) is performed on the terminal 102.

First, in step S21, the processor 111 sets, as a receipt (valid registration period), a period for one month from the time when an operation of subscribing to the periodic service (including an operation of subscribing again) is completed, and transmits data relevant to the set receipt, to the server 101. The server 101 stores the data relevant to the receipt transmitted from the terminal 102, as the receipt data 324. Then, the process proceeds to step S22. It is noted that, if a withdrawal procedure (withdrawal operation) is not taken during the period in which the receipt is set, the receipt is updated with a new receipt for one month at the time when the receipt has expired, and data relevant to the updated receipt is stored as the receipt data 324.

In step S22, the processor 111 determines whether or not the subscription procedure at this time is a procedure of subscribing again. Specifically, the processor 111 acquires the receipt data 324 from the server 101, and determines whether or not the subscription procedure is a procedure of subscribing again, on the basis of the receipt setting history indicated by the receipt data 324. If a result of the determination is YES, the process proceeds to step S23, and if a result of the determination is NO, the process proceeds to step S26.

In step S23, the processor 111 determines whether or not withdrawal (see (1) of FIG. 6) is done while bonus distribution is performed under the second bonus distribution rule. Specifically, the processor 111 acquires the bonus distribution rule data 327 from the server 101, and determines whether or not bonus distribution had been performed under the second bonus distribution rule (which of the first bonus distribution rule or the second bonus distribution rule had been applied) at the time of the last withdrawal before subscribing again at this time, on the basis of the bonus distribution rule data 327. If a result of the determination is YES (in a case of withdrawing under the second bonus distribution rule), the process proceeds to step S24, and if a result of the determination is NO (in a case of withdrawing under the first bonus distribution rule), the process proceeds to step S26.

In step S24, the processor 111 determines whether or not the time when the operation of subscribing again is completed is at or before the next bonus distribution scheduled date and time under the second bonus distribution rule after the withdrawal. Specifically, the processor 111 acquires the bonus distribution timing data 325 from the server 101, and determines whether or not the subscribing operation completed time is at or before the next bonus distribution scheduled date and time described above, on the basis of the bonus distribution scheduled date and time indicated by the bonus distribution timing data 325. If a result of the determination is YES, the process proceeds to step S25, and if a result of the determination is NO, the process proceeds to step S26.

In step S25, the processor 111 sets the bonus distribution scheduled date and time on the basis of the second bonus distribution rule (see (2) of FIG. 6), and transmits data of the set bonus distribution scheduled date and time to the server 101. The server 101 updates the bonus distribution timing data 325 on the basis of the data of the bonus distribution scheduled date and time transmitted from the terminal 102. Then, the subscription relevant process is finished. It is noted that, if a receipt has been set at the bonus distribution scheduled date and time, a bonus is distributed at the bonus distribution scheduled date and time, and accordingly, the bonus distribution date and time history in the bonus distribution timing data 325 is updated and the bonus distribution history in the bonus distribution data 326 is updated.

On the other hand, in step S26, the processor 111 distributes a bonus for the time of subscribing or the time of subscribing again (see (3) of FIG. 6), and transmits data indicating that the bonus has been distributed, to the server 101. The server 101 updates the bonus distribution data 325 on the basis of the data transmitted from the terminal 102. Then, the process proceeds to step S27.

In step S27, the processor 111 sets the bonus distribution scheduled date and time on the basis of the first bonus distribution rule (see (3) of FIG. 6), and transmits data of the bonus distribution scheduled date and time to the server 101. The server 101 updates the bonus distribution timing data 325 on the basis of the data of the bonus distribution scheduled date and time transmitted from the terminal 102. Then, the subscription relevant process is finished.

FIG. 13 is an example of a flowchart showing the details of an account change relevant process executed in a case where an operation of replacing the account ID is performed for the periodic service as described specifically with reference to FIG. 7. It is noted that, in the exemplary embodiment, the periodic service subscription data 323 in the server 101 is confirmed by the processor 111 at a predetermined timing (e.g., when this game is started), whereby whether or not the user is subscribing to the periodic service is confirmed.

First, in step S31, the processor 111 distributes a bonus for the time of replacing the account ID (see (2) or (3) of FIG. 7), and transmits data indicating that the bonus has been distributed, to the server 101. The server 101 updates the bonus distribution data 326 on the basis of the data transmitted from the terminal 102. Then, the process proceeds to step S32.

In step S32, the processor 111 acquires the period of the last receipt before the account is changed, and the bonus distribution date and time thereof. Specifically, the processor 111 acquires the receipt data 324 and the bonus distribution data 326 from the server 101, and acquires the period of the last receipt (see receipt 2 in (1) of FIG. 7) on the account before the change (see "first account ID" described with reference to FIG. 7), and the bonus distribution date and time thereof. Then, the process proceeds to step S33.

In step S33, the processor 111 acquires the next bonus distribution scheduled date and time on the account before the change. Specifically, the processor 111 acquires the bonus distribution timing data 325 from the server 101, and acquires the next bonus distribution scheduled date and time (May 13, 12:00 in the example in FIG. 7) on the account before the change. Then, the process proceeds to step S34.

In step S34, the processor 111 acquires the further next bonus distribution scheduled date and time on the account before the change. Specifically, the processor 111 refers to the bonus distribution timing data 325 acquired from the server 101 in step S33, and acquires the bonus distribution scheduled date and time (June 13, 12:00 in the example in FIG. 7) next to the next bonus distribution scheduled date and time described above, as "determination date and time". Then, the process proceeds to step S35.

In step S35, the processor 111 acquires the period of the receipt of the account after the change. Specifically, the processor 111 acquires the receipt data 324 set on the account after the change (see "second account ID" described with reference to FIG. 7) from the server 101, and acquires the period of the receipt (see receipt 3 in (2) or (3) of FIG. 7) set on the account after the change. Then, the process proceeds to step S36.

In step S36, the processor 111 refers to the period of the receipt acquired in step S35 and determines whether or not the expiration date and time of the receipt on the account after the change are at or before the determination date and time described above. If a result of the determination is YES, the process proceeds to step S37, and if a result of the determination is NO, the process proceeds to step S38.

In step S37, the processor 111 sets the bonus distribution scheduled date and time by taking over those on the account before the change. Specifically, the processor 111 acquires the bonus distribution timing data 325 that had been set on the account before the change, from the server 101, and sets the distribution scheduled date and time indicated by the bonus distribution timing data 325, as the bonus distribution scheduled date and time on the account after the change (12:00 on 13th in each month, in the example in (2) of FIG. 7). Then, the account change relevant process is finished. It is noted that, if the receipt has been set at the bonus distribution scheduled date and time, a bonus is distributed at the bonus distribution scheduled date and time, and accordingly, the bonus distribution date and time history in the bonus distribution timing data 325 is updated and the bonus distribution history in the bonus distribution data 326 is updated.

On the other hand, in step S38, the bonus distribution scheduled date and time are set at the date and time in each month corresponding to the predetermined specific time that comes first next to the expiration time of the receipt on the account after the change. Specifically, in a case where the expiration time of the receipt on the account after the change acquired in step S35 is before the next predetermined specific time that comes first as described above (12:00 in the example in (3) of FIG. 7), the processor 111 sets the specific time in each month corresponding to the date of the expiration day of the receipt, as the bonus distribution scheduled date and time. On the other hand, in a case where the expiration time of the receipt is at or after the next predetermined specific time that comes first as described above, the processor 111 sets the specific time in each month corresponding to the date next to the expiration day of the receipt, as the bonus distribution scheduled date and time. In the example in (3) of FIG. 7, 12:00 on 5th in each month is set as the bonus distribution scheduled date and time. Then, the account change relevant process is finished.

Thus, the detailed description of the information processing in the exemplary embodiment is finished.

As described above with reference to FIG. 5, FIG. 6, and FIG. 12, in the exemplary embodiment, in a case of withdrawing from the periodic service while the second bonus distribution rule is applied to the periodic service, and then subscribing again in a comparatively short period from the withdrawal, application of the second bonus distribution rule continues, and on the other hand, in a case of subscribing again after a comparatively long period from the withdrawal, the first bonus distribution rule is applied. Thus, in the exemplary embodiment, it is possible to change the bonus distribution rule appropriately in accordance with the period until subscribing again after the withdrawal from the periodic service.

In addition, as described above with reference to FIG. 7 and FIG. 13, in the exemplary embodiment, in a case of withdrawing from the periodic service while the first bonus distribution rule is applied to the periodic service, and then replacing the account, if the receipt set by the account replacement expires in a comparatively short period from the withdrawal, a bonus is distributed at the time when the account replacement procedure is completed, and a bonus is distributed at the bonus distribution scheduled date and time that have been set before the account replacement procedure. On the other hand, if the receipt set by the account replacement expires after a comparatively long period from the withdrawal, a bonus is distributed at the time when the account replacement procedure is completed, and thereafter, a bonus is distributed at the date and time in each month corresponding to the predetermined specific time that comes first next to the expiration time of the receipt. Thus, in the exemplary embodiment, it is possible to change the bonus distribution scheduled date and time appropriately in accordance with the period until the receipt set by the account replacement expires from the withdrawal from the periodic service.

[Modifications]

In the above exemplary embodiment, the example in which the account ID is set when the game is started for the first time after the game application is installed, has been shown (see FIG. 11). However, in another exemplary embodiment, the account ID may be set at the time of subscribing to the periodic service described with reference to FIG. 12 and the like.

In the above exemplary embodiment, the example in which the server 101 and the terminal 102 cooperate to perform the information processing described above, has been shown. However, in another exemplary embodiment, most or all of the various data stored in the server 101 as described above may be stored in the terminal 102, and a major part or the entirety of the information processing may be performed on the terminal 102 side.

In the above exemplary embodiment, the case where a periodic service (subscription service) is provided for the game application has been described as an example. However, in another exemplary embodiment, a periodic service may be provided for another type of application.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. An information processing system comprising a processor and a memory coupled thereto, the processor being configured to control the information processing system to at least:
    execute an application on the basis of data associated with each user ID;
    determine whether or not a periodic service with a valid registration period set therefor is registered on an account ID associated with the user ID;

in a case where change processing is performed so that the account ID associated with the user ID is changed from a first account ID on which the periodic service is not registered to a second account ID on which the periodic service is registered, if the periodic service had been registered on the first account ID at or before an execution timing of the change processing, determine a first valid registration period which is the valid registration period of the periodic service having been registered on the first account ID;

determine a first distribution timing which is a distribution timing that allows provision of an in-game item corresponding to the first valid registration period on the application;

acquire a second distribution timing which is a distribution timing next to the first distribution timing, and a third distribution timing which is a distribution timing next to the second distribution timing;

determine a second valid registration period which is the valid registration period of the periodic service associated with the second account ID;

if a timing at which the second valid registration period expires is at or before the third distribution timing, determine, as the third distribution timing, a post-change distribution timing which is a distribution timing for a first time after the execution timing of the change processing, or if the timing at which the second valid registration period expires is after the third distribution timing, determine the post-change distribution timing in accordance with the second valid registration period; and provide an in-game item on the application at both of timings from the first distribution timing onward and from the post-change distribution timing onward.

2. The information processing system according to claim 1, wherein
the post-change distribution timing is determined to be a predetermined timing which is determined in accordance with an expiration timing of the second valid registration period and which is at or after the expiration timing.

3. The information processing system according to claim 2, wherein
only if the second valid registration period that has expired is continuously updated to be a new one as the second valid registration period, the in-game item is provided on the application from the post-change distribution timing onward.

4. The information processing system according to claim 3, wherein
the post-change distribution timing is determined to be a predetermined time that comes first at or after the expiration timing of the second valid registration period.

5. The information processing system according to claim 1, wherein
the first distribution timing is determined to be a predetermined time that comes first at or after a start timing of the first valid registration period.

6. The information processing system according to claim 1, wherein
the in-game item is provided on the application at the execution timing of the change processing.

7. The information processing system according to claim 1, wherein
in a case where, when the first valid registration period has expired, the first valid registration period is updated, the updated first valid registration period is determined to be a period having a same length as the expired first valid registration period.

8. The information processing system according to claim 7, wherein
the period having the same length is one month.

9. The information processing system according to claim 1, wherein
the second valid registration period is determined to be a period having a same length as the first valid registration period.

10. A processing apparatus comprising a processor and a memory coupled thereto, the processor being configured to control the processing apparatus to at least:
execute an application on the basis of data associated with each user ID;
determine whether or not a periodic service with a valid registration period set therefor is registered on an account ID associated with the user ID;
in a case where change processing is performed so that the account ID associated with the user ID is changed from a first account ID on which the periodic service is not registered to a second account ID on which the periodic service is registered, if the periodic service had been registered on the first account ID at or before an execution timing of the change processing, determine a first valid registration period which is the valid registration period of the periodic service having been registered on the first account ID;
determine a first distribution timing which is a distribution timing that allows provision of an in-game item corresponding to the first valid registration period on the application;
acquire a second distribution timing which is a distribution timing next to the first distribution timing, and a third distribution timing which is a distribution timing next to the second distribution timing;
determine a second valid registration period which is the valid registration period of the periodic service associated with the second account ID;
if a timing at which the second valid registration period expires is at or before the third distribution timing, determine, as the third distribution timing, a post-change distribution timing which is a distribution timing for a first time after the execution timing of the change processing, or if the timing at which the second valid registration period expires is after the third distribution timing, determine the post-change distribution timing in accordance with the second valid registration period; and
provide an in-game item on the application at both of timings from the first distribution timing onward and from the post-change distribution timing onward.

11. A computer-readable non-transitory storage medium having stored therein instructions that, when executed by a processor of an information processing apparatus, cause the information processing apparatus to:
execute an application on the basis of data associated with each user ID;
determine whether or not a periodic service with a valid registration period set therefor is registered on an account ID associated with the user ID;
in a case where change processing is performed so that the account ID associated with the user ID is changed from a first account ID on which the periodic service is not registered to a second account ID on which the periodic service is registered, if the periodic service had been registered on the first account ID at or before an execution timing of the change processing, determine a first valid registration period which is the valid registration period of the periodic service having been registered on the first account ID;

determine a first distribution timing which is a distribution timing that allows provision of an in-game item corresponding to the first valid registration period on the application;

acquire a second distribution timing which is a distribution timing next to the first distribution timing, and a third distribution timing which is a distribution timing next to the second distribution timing;

determine a second valid registration period which is the valid registration period of the periodic service associated with the second account ID;

if a timing at which the second valid registration period expires is at or before the third distribution timing, determine, as the third distribution timing, a post-change distribution timing which is a distribution timing for a first time after the execution timing of the change processing, or if the timing at which the second valid registration period expires is after the third distribution timing, determine the post-change distribution timing in accordance with the second valid registration period; and provide an in-game item on the application at both of timings from the first distribution timing onward and from the post-change distribution timing onward.

12. An information processing method executed by a computer configured to control an information processing system, the information processing method causing the information processing system to:

execute an application on the basis of data associated with each user ID;

determine whether or not a periodic service with a valid registration period set therefor is registered on an account ID associated with the user ID;

in a case where change processing is performed so that the account ID associated with the user ID is changed from a first account ID on which the periodic service is not registered to a second account ID on which the periodic service is registered, if the periodic service had been registered on the first account ID at or before an execution timing of the change processing, determine a first valid registration period which is the valid registration period of the periodic service having been registered on the first account ID;

determine a first distribution timing which is a distribution timing that allows provision of an in-game item corresponding to the first valid registration period on the application;

acquire a second distribution timing which is a distribution timing next to the first distribution timing, and a third distribution timing which is a distribution timing next to the second distribution timing;

determine a second valid registration period which is the valid registration period of the periodic service associated with the second account ID;

if a timing at which the second valid registration period expires is at or before the third distribution timing, determine, as the third distribution timing, a post-change distribution timing which is a distribution timing for a first time after the execution timing of the change processing, or if the timing at which the second valid registration period expires is after the third distribution timing, determine the post-change distribution timing in accordance with the second valid registration period; and provide an in-game item on the application at both of timings from the first distribution timing onward and from the post-change distribution timing onward.

* * * * *